US006763506B1

(12) United States Patent
Betz et al.

(10) Patent No.: US 6,763,506 B1
(45) Date of Patent: Jul. 13, 2004

(54) METHOD OF OPTIMIZING THE DESIGN OF ELECTRONIC SYSTEMS HAVING MULTIPLE TIMING CONSTRAINTS

(75) Inventors: Vaughn Timothy Betz, Toronto (CA); David Reid Galloway, Toronto (CA)

(73) Assignee: Altera Corporation, San Jose, CA (US)

( * ) Notice: Subject to any disclaimer, the term of this patent is extended or adjusted under 35 U.S.C. 154(b) by 284 days.

(21) Appl. No.: 09/792,296

(22) Filed: Feb. 23, 2001

Related U.S. Application Data

(60) Provisional application No. 60/218,066, filed on Jul. 11, 2000.

(51) Int. Cl.[7] ............................ G06F 17/50; G06F 9/45; G06F 9/455; G06F 19/00
(52) U.S. Cl. ..................... 716/6; 716/8; 716/9; 716/10; 716/12; 716/18; 438/129; 702/85; 703/19
(58) Field of Search .......................... 716/2, 4, 6, 8–12, 716/14, 18; 438/129; 702/85; 703/19; 700/28

(56) References Cited

U.S. PATENT DOCUMENTS

| | | | |
|---|---|---|---|
| 4,630,219 A * | 12/1986 | DiGiacomo et al. ............ 716/9 |
| 4,698,760 A | 10/1987 | Lemback et al. ............ 364/490 |
| 4,916,627 A * | 4/1990 | Hathaway .................... 364/490 |
| 5,003,487 A * | 3/1991 | Drumm et al. ................ 716/18 |
| 5,218,551 A | 6/1993 | Agrawal et al. ............ 364/491 |
| 5,237,514 A | 8/1993 | Curtin ......................... 364/490 |
| 5,396,435 A | 3/1995 | Ginetti ........................ 364/489 |
| 5,397,749 A * | 3/1995 | Igarashi .......................... 716/8 |
| 5,521,837 A | 5/1996 | Frankle et al. .............. 364/491 |
| 5,553,000 A | 9/1996 | Dey et al. .................... 364/488 |
| 5,608,645 A | 3/1997 | Spyrou ....................... 364/491 |
| 5,659,484 A | 8/1997 | Bennett et al. ............. 364/491 |
| 5,666,290 A | 9/1997 | Li et al. ..................... 364/491 |
| 5,880,967 A * | 3/1999 | Jyu et al. ....................... 716/6 |
| 6,173,435 B1 * | 1/2001 | Dupenloup .................. 716/18 |

* cited by examiner

Primary Examiner—A.M. Thompson
Assistant Examiner—Chris C. Chu
(74) Attorney, Agent, or Firm—Beyer Weaver & Thomas LLP

(57) ABSTRACT

An electronic representation of the electronic design is received which includes various connections between various blocks specifying functions performed within the electronic design. Each of the connections forms part of one or more paths through at least a portion of the electronic design. Each path has an associated timing constraint. The method assigns criticality values to at least one of the connections. These criticality values are based upon a slack ratio that is a function of the timing constraints and values of slack for paths on which the connections reside. The electronic representation may be revised in a manner that biases the representation toward a state in which connections having relatively high criticality are not changed in a manner which increases the delay in those connections or are changed in a manner that reduces delay. In some cases, the timing constraints for a path, and possibly all coupled paths, are relaxed when a connection has a negative slack ratio, negative slack, or routability problems.

52 Claims, 12 Drawing Sheets

| Connection | Slack(ns) | Timing Constraint (ns) | Slack Ratio | Criticality computed as 1/Slack | Criticality computed as 1/slack ratio |
|---|---|---|---|---|---|
| A | 2.0 | 100.0 | 0.02 | 0.5 | 50 |
| B | 2.0 | 4.0 | 0.50 | 0.5 | 2 |

FIG. 4

METHOD OF OPTIMIZING THE DESIGN OF ELECTRONIC SYSTEMS HAVING MULTIPLE TIMING CONSTRAINTS

Cross-Reference to Related Applications

This application claims priority of provisional U.S. Patent Application Serial No. 60/218,066 filed Jul. 11, 2000, titled "Method of Optimizing the Design of Electronic Systems Having Multiple Timing Constraints" which is incorporated by reference.

BACKGROUND OF THE INVENTION

The present invention relates to computer-assisted methods and apparatus for generating or compiling electronic designs such as designs for digital integrated circuits. More specifically, the invention relates to improvements in using timing information while compiling electronic designs.

Electronic design automation ("EDA") is becoming increasingly complicated and time consuming, due in part to the greatly increasing size and complexity of the electronic devices designed by EDA tools. Such devices include general purpose microprocessors as well as custom logic devices including Application Specific Integrated Circuits ("ASICs"). Examples of integrated circuits include non-programmable gate arrays, field programmable gate arrays ("FPGAs"), and complex programmable logic devices ("PLDs" or "CPLDs"). The design of even the simplest of these devices typically involves generation of a high level design, logic simulation, generation of a network, timing simulation, etc.

Meeting timing requirements is important to the correct operation of an integrated circuit. For example, for a plurality of D-type flip-flops ("DFFs") to feed through some logic to another plurality of DFFs, it is generally required that the signals from the first set of DFFs must finish propagating through any intermediate logic and have settled to their final state on the D-input of each of the destination DFFs before the next rising edge of the clock. (In fact they must finish before the next clock edge by an amount known as the setup delay of the register $T_{su}$.) If the delay through the resulting logic is greater than the time between rising clock edges, then the state that the destination DFFs will hold on the next clock edge will be undefined.

In order to implement a source electronic design, such as might be represented by a schematic or netlist among other possibilities, into a hardware device, such as a PLD or CPLD, several steps are used to generate an efficiently implemented design. BTwo of these steps are placement and routing. Placement and routing are responsible for assigning logic elements in a source electronic design to individual locations in the target device, such a s a programmable logic device. Most circuit optimization methods, such as those occurring during placement and routing, depend upon an identification of "critical connections" between circuit elements or blocks. A delay for a path will be the sum of delays on its constituent connections. Critical paths include those signal paths with excessive delays and that play an important role in limiting the performance of the electronic design implemented in the hardware device. There may be several critical paths in a circuit. The cycle time of the clock that controls the DFF's at the beginning and end of the path cannot be any less than this delay. A critical path may consist of one or more connections, and all those connections will be critical. Those connections lying on critical paths will be labeled critical connections and are described as having high criticality. Emphasis is made during optimization to optimize the timing of those connections having the greatest criticality. For example, during placement, the placement algorithm will attempt to keep those elements or blocks having a critical connection in a configuration where the connection would be made with as little delay as possible, i.e. by interconnecting the elements or blocks with fast wiring lines.

Prior approaches have computed the criticality of a connection based on its "slack". The slack of a connection is the amount of delay that could be added to a connection without causing any timing constraint depending on that connection to be violated. Stated another way, for a given connection, slack is the deviation of the calculated arrival time made by timing analysis from the required arrival time specified by the designer. See "Use of Slack as a Measurement of Being On Time and the Procedure for Calculating Slack," IBM Technical Disclosure Bulletin, November 1982, pp. 2826–2830. Negative slacks indicate that the calculated path timing exceeds the timing constraint. Criticality is an inverse function of slack. Connections with low, zero, or negative slack have a high criticality.

One method of timing analysis currently used in circuit optimization estimates the slack of each connection to determine which connections are critical and therefore need to be made or placed using fast wiring lines to avoid slowing down the circuit. For example, in implementing a design into a programmable logic device, a placement and routing tool would assign the source design logic elements to individual locations on the device. To minimize delay in a hierarchical architecture device, the connection between logic elements might use a local connection, i.e. occurring within the same logic array block ("LAB"), as the "fast wiring". In other devices, the "fast" wiring might be determined by minimizing the length of the connection between the two logic elements. Current methods have difficulty in identifying the most critical of the connections. For example, current methods on some occasions, fail to differentiate between connections having identical slacks but lying on different paths having different relative margins for additional delay. This may occur, for example, when a connection is on a path having a relatively large timing constraint, e.g., 100 nanoseconds ("ns"). On some of such paths, there may be little margin for additional delay. Yet, the connection at issue may possess the same slack value (say 2 nanoseconds) as another connection that is on a different path that has a relatively small timing constraint, say 4 nanoseconds. While the slack based criticality of the two connections is identical, their true criticality is rather different. The first path has very little slack remaining relative to the length of the timing constraint on which it lies (98 nanoseconds of the 100 nanosecond delay budget for the path is used up). So it is more likely that the timing constraint on the first connection here will be violated than the timing constraint on the second connection.

Under current approaches, an initial timing analysis will often yield several connections having a negative slack. These negative slacks generally must be dealt with separately in a criticality computation and tend to lead to many connections with high criticality. Excessive numbers of connections with high criticality tend to make the optimization tools behave poorly because they are attempting to optimize too many connections at once and, as a result, optimize all connections poorly. Another problem to be addressed, them, is how to deal with negative slack connections so that the portion of negative slack connections with the highest criticality are optimized first. What is needed is an improved method for determining criticality.

SUMMARY OF THE INVENTION

The present invention provides a method of generating an electronic design. Optimizing the timing of a circuit relies on methods of identifying critical connections between circuit elements or blocks. Extra effort is made during optimization to ensure that connections with the highest criticality have their timing optimized. The invention provides a new method of computing the criticality of connections in electronic systems with multiple timing constraints. The criticality is computed as a function of slack ratio. Slack is the amount of delay that can be added to a connection without causing any timing constraint depending on that connection to be violated. The slack ratio of a path is the slack of that path divided by the magnitude of the timing constraint applicable to that path. Connections typically lie on multiple paths, each of which is potentially governed by a different timing constraint. The slack ratio of a connection is the minimum slack ratio of all the paths that pass through that connection. An electronic representation of the electronic design is received which includes various connections between various blocks specifying functions performed within the electronic design. Each of the connections forms part of one or more paths through at least a portion of the electronic design. At least one of the paths have an associated timing constraint. The method assigns criticality values to at least one of the connections. These criticality values are based upon a slack ratio that is a function of the timing constraints and values of slack for paths on which the connections reside. The method furthermore revises the electronic representation in a manner that biases the representation toward a state in which individual connections having relatively high criticality are not changed in a manner which increases the delay or changes them in a manner which reduces delay.

Another aspect of the invention provides a method for generating an electronic design wherein the timing constraints for a path and all coupled paths are relaxed when a connection has a negative slack ratio. An electronic representation of the electronic design is received which includes various connections between various blocks specifying functions performed within the electronic design. Each of the connections forms part of one or more paths through at least a portion of the electronic design. At least one of the paths have an associated timing constraint. The method relaxes the timing constraint for a path and any coupled timing constraints proportionately. Criticality values are assigned to at least one of the connections and the electronic representation is revised, biased towards a state in which individual connections having relatively high criticality are changed in a manner that reduces delay. In yet another aspect, the present invention provides a method for relaxing timing constraints and coupled timing constraints proportionately when routability problems occur.

These and other features and advantages of the present invention are described below with reference to the drawings.

BRIEF DESCRIPTION OF THE DRAWINGS

FIG. 4 is a table comparing criticalities based on slacks and slack ratios.

DETAILED DESCRIPTION

Figure 1:
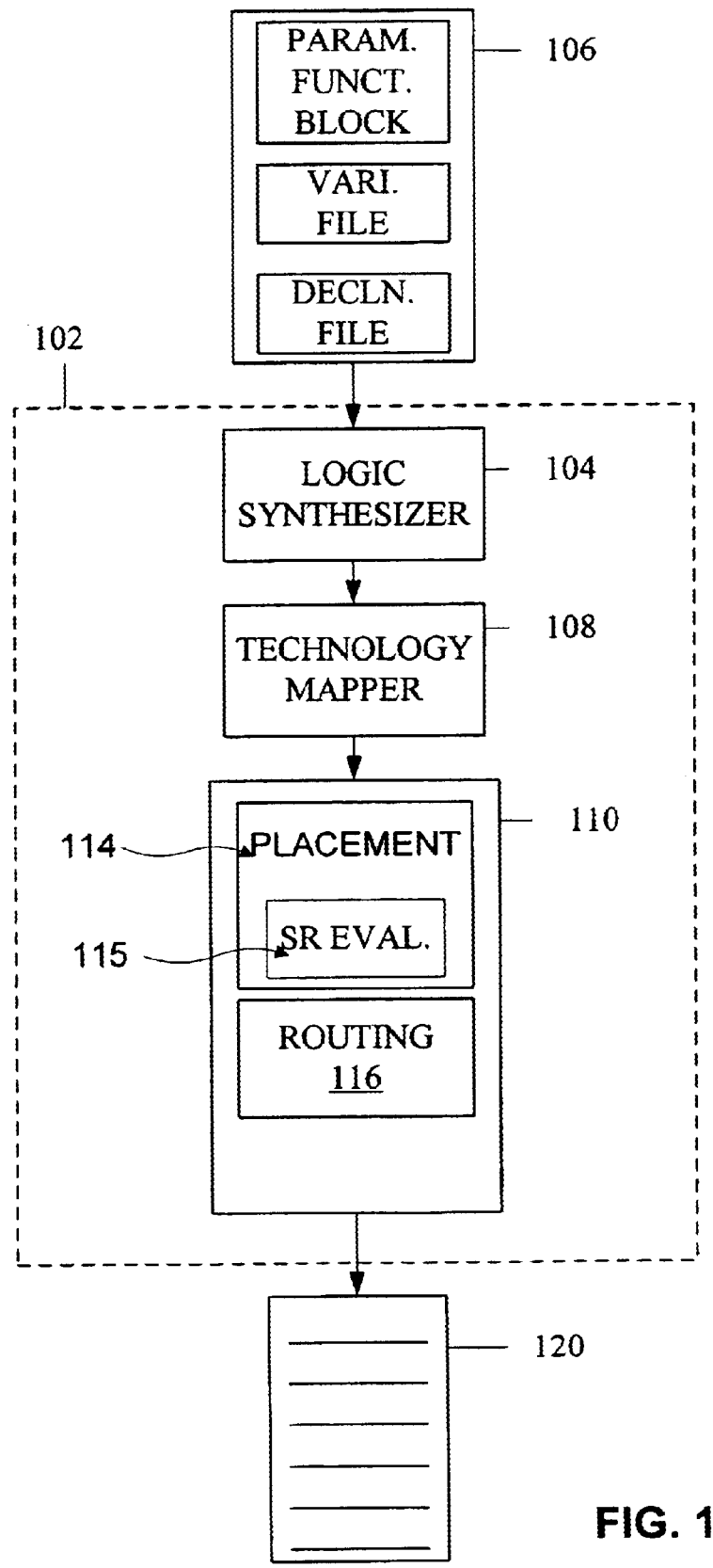
FIG. 1 is a schematic/process diagram illustrating the components and general flow of a compiler that may be used in conjunction with the present invention.

Reference will now be made in detail to some embodiments of the invention. Examples of embodiments are illustrated in the accompanying drawings. While the invention will be described in conjunction with these embodiments, it will be understood that it is not intended to limit the invention to any particular embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The invention provides methods and apparatus for compiling an electronic design using slack ratios to identify and evaluate critical connections. These methods help identify the most critical connections from a group whose connections might otherwise appear to be equally critical. Optimizing the timing of a circuit relies on methods of identifying critical connections between circuit elements or blocks. Efforts are made during optimization to focus the timing optimization on connections with the highest criticality. The invention provides a new method of computing the criticality of connections in electronic systems including those with multiple timing constraints. The criticality is computed as a function of slack ratio. The slack ratio of a path is the slack of that path divided by the magnitude of the potentially relaxed timing constraint applicable to that path. The slack ratio of a connection is the minimum slack ratio of all the paths that pass through that connection.

Some of the terms used herein are not commonly used in the art. Other terms have multiple meanings in the art. Therefore, the following definitions are provided as an aid to understanding the description that follows. The invention as set forth in the claims should not necessarily be limited by these definitions.

The term "compiler" is used throughout this specification to refer to software and apparatus for running such software that compiles an electronic design. Its functions may include extracting and synthesizing a netlist, mapping the design to a given hardware architecture, placing and routing the design, simulating the design, etc.

The term "electronic design" generically refers to the logical structure of an electronic device such as an integrated circuit. It may be implemented on hardware (usually referred to herein generically as a "target hardware device"). During the design and development effort, an electronic design may exist in various states or stages. It may be provided as a high level Boolean representation (encoded in a hardware design language for example), a schematic or circuit representation, or any other form representing the logical arrangement of a device. It may include other facets such as floor-plan constraints, wave-form constraints, timing constraints, fitting constraints, etc. At the gate level, it may exist as a netlist (whether synthesized or not) prior to placement on a target hardware device. It may even include completed place and route assignments.

A "netlist" is used to describe the functionality of a digital circuit design that can be implemented on a programmable logic device or other target hardware device. The netlist is represented as hierarchical collection of gates, state machines, high level constructs such as counters or adders, or any other means of defining a collection of outputs based on a collection of inputs. The nodes of the netlist (gates, state machines, etc.) are connected together via nets. Each of these nets is associated with a named digital signal. A netlist may be synthesized to remove redundant logic, simplify the gate layout provided by a user, etc.

When in the form of a synthesized netlist, an electronic design may be divided into "logic cells" representing various logic functions within the electronic design. During compilation, these logic cells are mapped onto physical structures known as "logic elements" which reside on the target hardware device. The criteria for mapping gates into logic cells is that the resulting logic cell must be able to be put into one logic element. An example of a logic cell is a collections of gates (connected in some way and implemented in a look-up table) combined with a register and configured to implement a multiplexer.

The term "target hardware device" refers to a hardware device on which an electronic design is implemented. In the case of non-programmable integrated circuits such as gate arrays, the electronic design defines the arrangement of metal lines on one or more metallization layers of the target hardware device. In the case of programmable integrated circuits such as PLDs, the electronic design defines the gates as well as interconnects to be programmed on the target hardware device.

In the context of this invention, a target hardware device typically includes a plurality of logic elements which house logic cells from an electronic design in order to implement the logic functions specified by these cells. The logic elements are typically a fundamental element of the hardware device's architecture on which different logic gates can be defined. These elements may be grouped into blocks such that each logic element is associated with a block (or other arbitrary containment entity). There may be higher level organization in the device such that logic blocks are grouped into rows or some other arbitrary entity.

A "connection" is an electrical link from the output of one block to the input of another block. Often, a connection is embodied as a conductive strip (e.g. a metal strip) or a switch together with a conductive strip. Examples of these blocks include logic gates, registers, memory, logic cells, I/O pads, groups of logic elements such as logic array blocks, etc.

The present invention can be applied to all phases of the design process, including but not limited to placement and routing. In placement, a compiler positions logic cells of the electronic design with respect to logic elements of a target hardware device. The invention may employ generic place and route algorithms—including many conventional and commercially available algorithms—employed during design development.

In one embodiment, the compiler is divided into software submodules. Referring to FIG. 1, an exemplary compiler 102 includes a logic synthesizer 104 which creates a synthesized netlist from a user's high level (source) electronic design 106 (including variation files, parameterized functional block files, declaration files, symbol files, etc.). These various source design files are software files which define the logic functions and the individual interconnections between the individual logic function elements in the source design. Compiler 102 also includes a technology mapper 108 that maps gates from the synthesized netlist into logic cells. Gates are switching elements in a circuit which have defined outputs depending upon the voltage levels applied to the gate inputs. A netlist is a textual representation of a schematic. Finally, compiler 102 includes a place and route module 110 that in turn includes a placement module 114 and a routing module 116. Placement module 114 places logic cells onto specific logic elements of a target hardware device. Routing module 116 connects wires between the inputs and outputs of the various logic elements in accordance with the logic required to implement the electronic design. Compiler 102 outputs a compiled design 120. It should be understood that other compiler designs may be employed with this invention. For example, some compilers will include a partitioning module to partition a technology-mapped design onto multiple hardware entities. In addition, the compiler may be adapted to handle hierarchical designs, whereby synthesis, mapping, etc. are performed recursively as the compiler moves down branches of a hierarchy tree. Shown within the placement module 114 is criticality evaluation module 115, wherein the slack ratios of the present invention are calculated to evaluate criticality as further described below.

A user can create an initial source electronic design by various methods. For example, a schematic editor program allows the user to enter and/or modify a schematic diagram of the electronic design using the display screen, generating a net list (summary of connections between components) in the process. An equivalent method for entering an electronic design involves providing a description of the design in a Hardware Description Language (HDL). Examples of HDLs include Verilog and VHDL. The syntax of a VHDL description is described in IEEE Standard VHDL Language Reference Manual (IEEE Std 1076-1987). Like the schematic representation, the HDL representation also provides a net list. This source design is used to create the synthesized netlist output by logic synthesizer 104.

Figure 2:
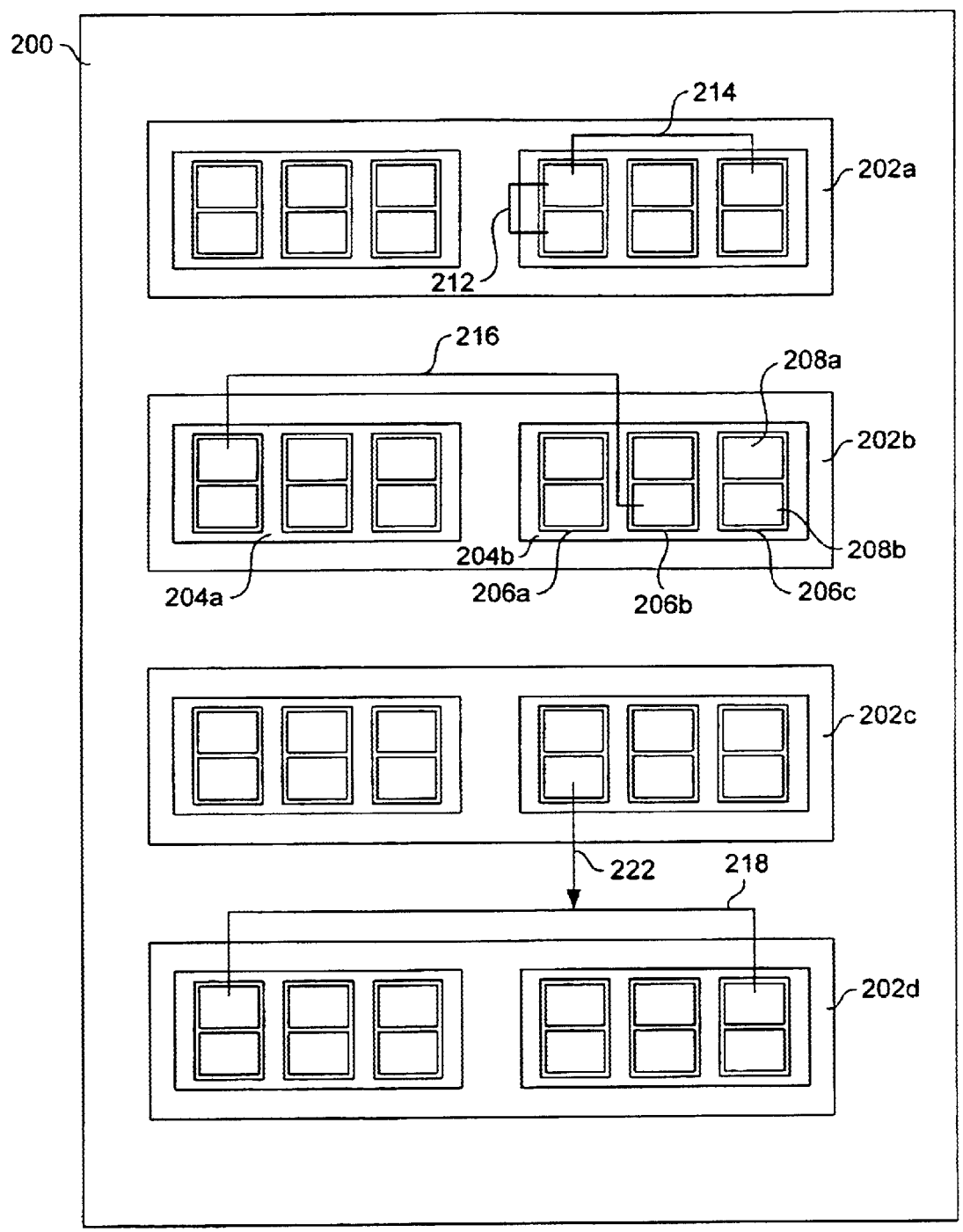
FIG. 2 is an idealized block representation of the architecture of an arbitrary hardware device, including interconnects.

Partitioning or clustering is one procedure occurring prior to the placement or routing of the design. In FIG. 2, an example programmable logic device 200 is segmented into a plurality of "rows" to facilitate interconnection between logic elements on a given row. In the hypothetical example shown, there are four rows: 202a, 202b, 202c, and 202d.

Each row of programmable logic device 200 is further subdivided into two "half-rows." For example, row 202b is shown to contain a half-row 204a and a half-row 204b. The next lower level of the hierarchy is the "logic array block" (LAB). Half-row 204b, for example, contains three LABs: an LAB 206a, an LAB 206b, and an LAB 206c. Finally, at the base of the of the hierarchy are several "logic elements." Each such logic element exists within a single logic array block. For example, LAB 206c includes two logic elements: a logic element 208a and a logic element 208b.

In short, PLD 200 includes four levels of hierarchy: (1) rows, (2) half-rows, (3) LABs, and (4) logic elements. Any logic element within PLD 200 can be uniquely specified (and located) by specifying a value for each of these four levels of the containment hierarchy. For example, logic element 208b can be specified as follows: row (2), half-row (2), LAB (3), LE (2).

Figure 5:
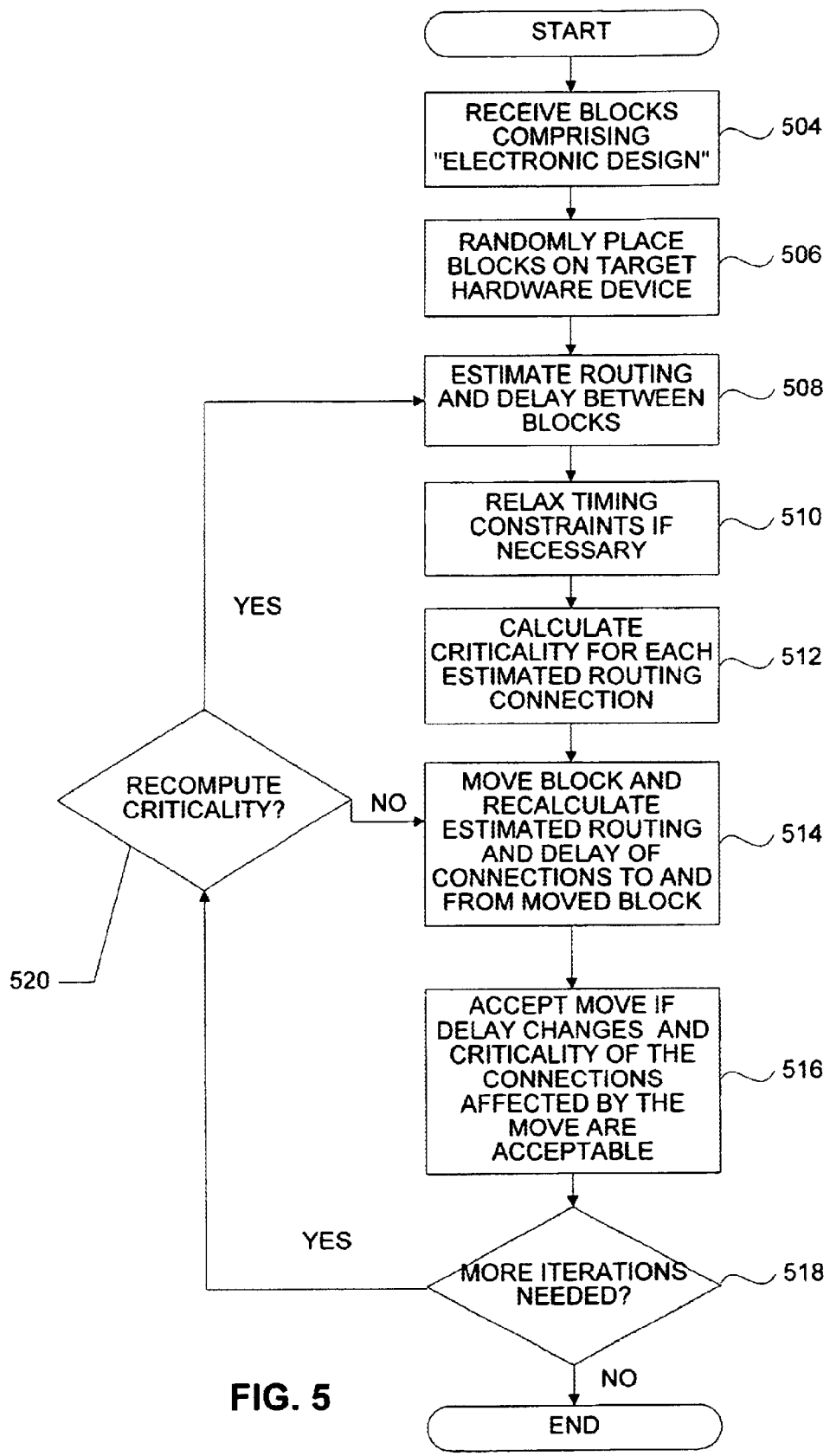
FIG. 5 is a flowchart illustrating a method for compiling an electronic design based on criticalities of connections in accordance with methods of the invention.

To fit a logic design onto a target hardware device such as that shown in FIG. 5, a synthesized netlist is divided into logic cells which are placed in the various logic elements as uniquely defined above. Thus, each logic cell from the synthesized netlist resides in a unique single logic element.

Often, a multi-level hierarchical structure such as that shown in PLD 200 includes multiple levels of routing lines (interconnects). These connect the uniquely placed logic cells to complete circuits. In PLD 200, for example, four levels of interconnect are provided, one for each of the four hierarchy levels. First, a local interconnect such as interconnect 212 is employed to connect two logic elements within the same LAB. At the next level, a LAB-to-LAB interconnect such as interconnect 214 is employed to connect two LABs within the same half-row. At the next higher level, a "global horizontal" interconnect is employed to connect logic elements lying in the same row but in different half-rows. An example of a global horizontal interconnect is interconnect 216 shown in row 202b. Another global horizontal interconnect is shown as interconnect 218, linking logic elements within row 202d. Finally, a "global vertical" interconnect is employed to link a logic element in one row with a logic element in a different row. For example, a global vertical interconnect 222 connects a logic element in the first LAB of the second half-row of row 202c to two separate logic elements in row 202d.

In a target hardware device, there will be many paths available for routing a given signal. Each of the interconnects identified above is a routing connection responsible for conveying signals between groups, as in the case of "global horizontal" or "global vertical" interconnects, or to interconnect elements within a group as for example accomplished by local interconnects 212 shown in FIG. 2. The interconnects are routing connections which make up one segment of a routing path. An example routing path employing an efficient link is shown by local interconnect 212 wherein the path from a register within the upper logic element in row 202a uses the short routing connection or conductor 212 to a register in the lower logic element within that single logic array block. During the routing stage, these various possible routing paths must be evaluated to determine which is best for the design being fit.

It should be understood that the present invention is not limited to the above described hierarchical architecture or any other hardware architecture for that matter. In fact, it is not even limited to programmable logic devices. It maybe employed generically in target hardware devices as broadly defined above and including applications such as ASIC's, circuit boards, full custom chips, and PLD's.

When partitioning is applied to intradevice structures such as rows or LABs, the goal is to reduce the amount of interstructure interconnects (e.g., global interconnects between rows). In a typical compilation scenario, the individual rows, LABs, logic elements, etc. are initially populated with logic in some arbitrary manner, i.e., the logic functions represented in the source electronic design are assigned initially to individual locations within the target programmable device. Then the compiler applies a partitioning algorithm to reduce the amount of input/output pins and/or non-local interconnects.

One class of partitioning algorithm that is particularly amenable to division into separate compilation tasks is the bipartitioning algorithms. In these algorithms, logic cells are initially placed in multiple bins (chips, rows, LABs, etc.). Then two bins are selected and some of the logic cells in those bins are swapped so that the number of signal crossings between the selected bins can be compared before and after the swap. Then two other bins are selected and their logic cells swapped. This continues until every binary combination is selected and their logic cells swapped. The ultimate goal is to minimize the sum of the signal crossings between bins.

Referring to FIG. 2, LABs 206a and 206b could be chosen initially and their logic cells swapped according to a standard algorithm, as identified below. In addition, LABs 206a and 206c could be subsequently selected and their cells swapped. Finally, LABs 206b and 206c could have their cells swapped. In the end, the swapping algorithms, applied according to the bipartitioning algorithm described, should reduce the number of signal crossings between the individual LABs. The same approach could be applied to logic cells in different rows. For example, the logic cells in rows 202a–202b, 202a–202c, 202a–202d, 202b–202c, 202b–202d, and 202c–202d could be subject to similar swapping algorithms, with the end goal being a reduction in interrow signal crossings.

Swapping heuristics are known in the art and described in the following references: U.S. Pat. No. 3,617,714, issued to Kernighan et al. on Nov. 2, 1971, and entitled "METHOD OF MINIMIZING THE INTERCONNECTION COST OF LINKED OBJECTS" and U.S. Pat. No. 5,341,308 issued to Mendel on Aug. 23, 1994, and entitled "METHODS FOR ALLOCATING CIRCUIT ELEMENTS BETWEEN CIRCUIT GROUPS."

For valid operation of an integrated circuit a signal must typically propagate from the output of a designated starting register or input, through the intermediate logic, to the inputs of the destination register before the arrival of the next rising clock edge. In this example, the timing constraint required by the selected path could be the clock speed. If the delay through the resulting logic is greater than the time between rising clock edges, then the state that the destination registers or DFFs will hold on the next clock edge will be undefined. Some circuit designs involve multiple timing constraints in the form of multiple clocks with the further variation of some devices requiring valid signals on falling clock edges instead of the rising or positive clock edges. Other variations of multiple timing constraints occur such as related clocks due to phase shifts or frequency multiples.

Timing constraints are defined in terms of paths. These are functions of a start point, an end point, and an allowed time delay value. These are measured by timing analysis tools as input to output, input to intermediate register, register to register, or register to output. Other types of timing constraints may be imposed on a circuit design. (e.g., Tco is clock through register to a design output.) These paths typically comprise several connections in series but could be limited to a single connection. A connection, therefore, would be a subset of a path.

A timing analysis is performed typically on the initial circuit design to determine if all paths meet the specified timing constraints. Timing optimization is thereafter performed to increase the performance (speed) of the circuit in two general circumstances. Often the initial placement of logic blocks or interconnects, depending on the involved phase of the design, has resulted in measured timing values exceeding the constraints imposed by the designer. Alternately the designer may have set no timing constraint but overall wishes the circuit speed to be increased. Often, one or a few connections will serve as a bottleneck preventing the entire circuit from running at a higher speed. Identifying those bottleneck connections and directing the circuit optimization techniques towards improving those connections is therefore critical to optimizing the performance of a circuit or in meeting the designer's timing constraints.

One embodiment of the present invention provides an improved method for determining the criticality of a connection. As mentioned, one common method established in the prior art for determining criticality was to first calculate a slack value for each connection. Slack can be defined as the amount of delay which could be added to the connection under examination without increasing the minimum cycle time of a circuit, assuming that the delays of all other connections remained constant. A connection could be on multiple paths which would require the timing analyzer to accept as the slack value for the connection the worst case slack (the smallest value of slack for all paths passing through the connection).

Figure 3:
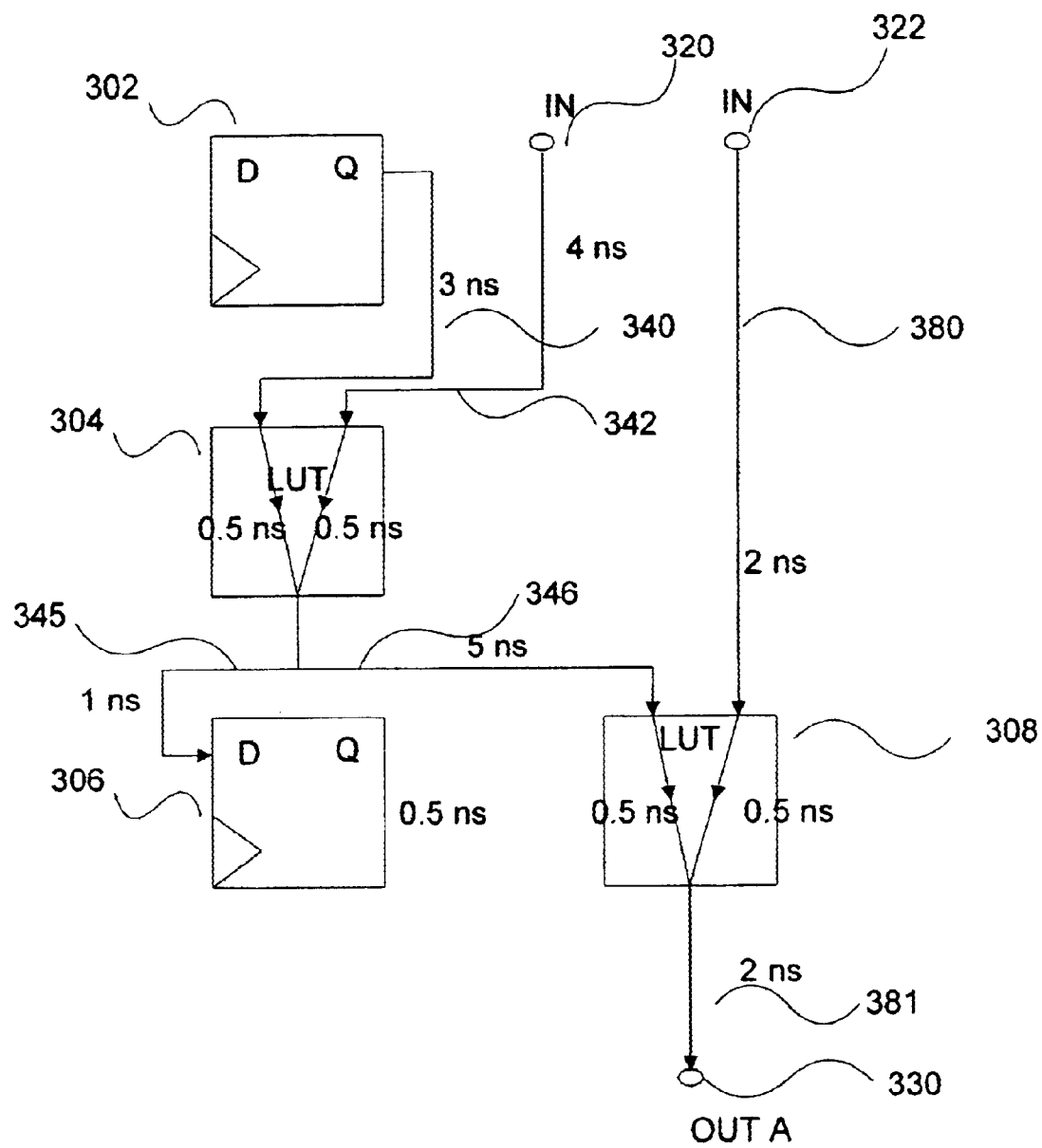
FIG. 3 is a diagram illustrating various path delays in a circuit.

FIG. 3 displays an example of circuitry where the connection of interest lies on multiple paths. In one example illustrating application of a timing constraint, the maximum delay can be determined by measuring delays from all inputs or register outputs to the outputs or register inputs and can then be compared against the maximum user-specified timing constraint. With respect to FIG. 3, the path with the largest delay defines the maximum delay through the circuit. Registers 302 and 306 are D type flip flops which, during a clock cycle, are capable of storing and making available at the outputs (the Q terminal) the values present at their inputs (D terminal) at the time of the appropriate clock edge. For this example five paths can be identified: 1) Register 302 (output) to Register 306 (input); 2) Input 320 to Register 306 (input); 3) Register 302 (output) to Output 330; 4) Input 320 to Output 330; and 5) Input 322 to Output 330. Look-up Tables (LUT) 304 and 308 are two-input look-up tables. Programmable logic devices use four-input look-up tables for providing logic functions. The maximum delay for a path can be determined by adding the delays associated with each circuit element or routing along the path. In the 5 paths identified in FIG. 3, the maximum delay of 12 ns lies on the path from input 320 to output 330 (the fourth path identified above). This path, therefore, is the critical path for the circuit and establishes a slack of zero for every connection on the path, assuming an optimization goal of operating the circuit as fast as possible. Using the 12 ns value as the timing constraint to apply to the path from input 322 to output 330, the slack value for connection 380 can easily be derived to be 7.5 ns since only one path travels through connection 380. The slack value here is derived by subtracting from the 12 ns path timing constraint the delay of 2 ns associated with connection 380, the delay of 0.5 ns associated with LUT 308, and the delay of 2 ns associated with connection 381. Even though connection 381 also lies on this same path, the slack value for connection 381 is zero since connection 381 lies on multiple paths, one of which is the circuit's critical path (input 320 to output 330). In addition to this critical path, connection 381 lies along the third and fifth paths identified above. The slack for connection 381 based only on the fifth path would be 7.5 ns, but since it also lies along the fourth path the slack value of zero must be substituted. Based only on the third path, the slack value of connection 381 would be 1 ns, again derived by subtracting from the maximum timing constraint of 12 ns the delay of 3 ns associated with connection 340, the delay of 0.5 ns associated with LUT 304, the delay of 5 ns associated with connection 346, the delay of 0.5 ns associated with LUT 308, and the delay of 2 ns associated with connection 381.

The prior approaches have used the slack of a connection to compute the criticality of that connection. A connection with zero or negative slack (the delay exceeds the applicable timing constraint) is considered highly critical while a connection with a large (positive) slack is considered to have a low criticality. A number of functions have been used to convert slacks to criticality including the simple function of 1/slack although more complex functions are usually employed.

The criticality of the present invention is based on first determining slack ratios for a connection. The present invention uses slack measured for each path in conjunction with a timing constraint for the path to determine a slack ratio which provides a relative measure of the connection's criticality. The slack ratio of a path is the slack of that path divided by the magnitude of the potentially relaxed timing constraint applicable to that path. The slack ratio of a connection is the minimum slack ratio of all the paths that pass through that connection. In the case of a connection being on several paths with different timing constraints, a slack ratio must be calculated separately for each path passing through the connection. One of the paths through the connection will lead to the worst slack ratio. The slack ratio selected for the connection is the minimum value determined from the multiple paths. It must be noted, however, that the timing constraint used in determining the slack ratio may be a relaxed constraint in accordance with several embodiments of the present invention.

Timing evaluations using slack ratios can provide a significantly different result than evaluations relying on slack alone. As shown by the example depicted in the table in FIG. 4, connections A and B both have a measured slack of 2.0 ns. Criticality based on the inverse relationship of the measured slack values also is identical for each of the two connections in the example. The slack ratios determined for each of these connections differ considerably because the timing constraints for the paths on which the specified connections lie differ, 100 ns in sample A but only 4 ns with respect to sample B. The slack ratio for connection A (0.02) is significantly different from the slack ratio for connection B (0.5). The criticalities based on slack ratios yield a value of 50 for connection A and only a value of 2 for connection B. This method, which establishes the critical connection as A, reflects that connection A has very little slack remaining relative to the length of the timing constraint on which it lies (98 ns of the 100 ns timing constraint imposed on the path has been used up). In contrast, only 2 ns of the available 4 ns timing constraint imposed on the path incorporating connection B has been used up. The slack ratio and the corresponding criticality measures capture the fact that the path on which connection A lies can only become 2% slower before problems arise whereas the path on which connection B lies can become 100% slower before problems arise. Connection B, therefore, could become twice as slow before the timing constraint is violated.

Criticality is an inverse function of the slack ratio. In one embodiment it is an inverse monotonic or monotonic decreasing function. A monotonic decreasing function always decreases as a increases, i.e. f(a) is less than f(b) for all a greater than b. A low slack ratio leads to high criticality whereas a slack ratio of 1 leads to low criticality. Criticality has in some embodiments been defined as the reciprocal of the slack ratio and in others a function of the reciprocal raised to a power. Other methods of converting slack ratio to criticality are possible such as using a lookup table or using a mathematical method. For example a slack ratio of less than 0.2 might yield a criticality of 1 whereas a slack ratio greater than 0.2 might map to a criticality of 0. Determining criticality will be a recurrent problem in analyzing circuits.

The specific timing constraints set by the designer may be impossible to achieve. Alternately, it may be desired to speed up the implemented circuit to as fast a speed as possible. During these design steps, which typically may be directed to the placement and routing routines but may include all phases of the design process, the user is likely to face negative slack on many connections. Obviously, the negative slack values must be made positive (or zero) to meet the timing constraints and allow the electronic design to function in its intended manner. However, all connections having negative slacks are not of equal criticality. Efforts at transforming them to positive slack values while maintaining their proper criticality relationship with other connections have been unsuccessful. Attempting to optimize large numbers of negative slack ratio connections tends to result in poor optimization of both timing constraints and other goals. To avoid the problems imposed by negative slacks and negative criticalities, one aspect of the present invention employs a timing constraint relaxation process to prevent negative slacks and slack ratios from occurring. When a slack is negative on some path for some timing constraint, the time allowed for a timing constraint is temporarily increased or relaxed. The objective of the relaxation is to evaluate criticality based on comparing connections having positive slacks or slack ratios. Slack ratio calculation requires determining the length of a path and the time permitted for the path.

FIG. 5 shows a flowchart of the process involved in improving the timing characteristics of a circuit. While this specific embodiment is applied to the placement process, it should be noted that the methods described in this application are not so limited and could be applied to any phase of the design process including but not limited to routing and clustering. The electronic design is initially received (504). This typically might involve the placement of the logic blocks into logical elements such as blocks 208a and 208b shown placed in FIG. 2. Clustering or partitioning is the design subprocess involved in determining which logical elements of the design will be grouped together within the same LAB. These groups of logic elements can be intelligently placed into LAB's based in part on the connections required between two Logic cells. The larger logical blocks ("LAB's") are then randomly placed on the target hardware device (506). These blocks are placed in legal slots, i.e. slots capable of accepting LAB's. In a specific embodiment, for a target device, data as to the best routing between two points and the delays associated with all routings will have been previously profiled. Using this information, the routing between the blocks (LAB's) is estimated (508) and the associated delays provided. As indicated, random placement of blocks will usually result in a slow circuit with several connections having negative slacks. After the circuit delays are determined timing constraints are relaxed if necessary (510). All paths will be examined to determine if negative slacks exist.

Figure 6A:
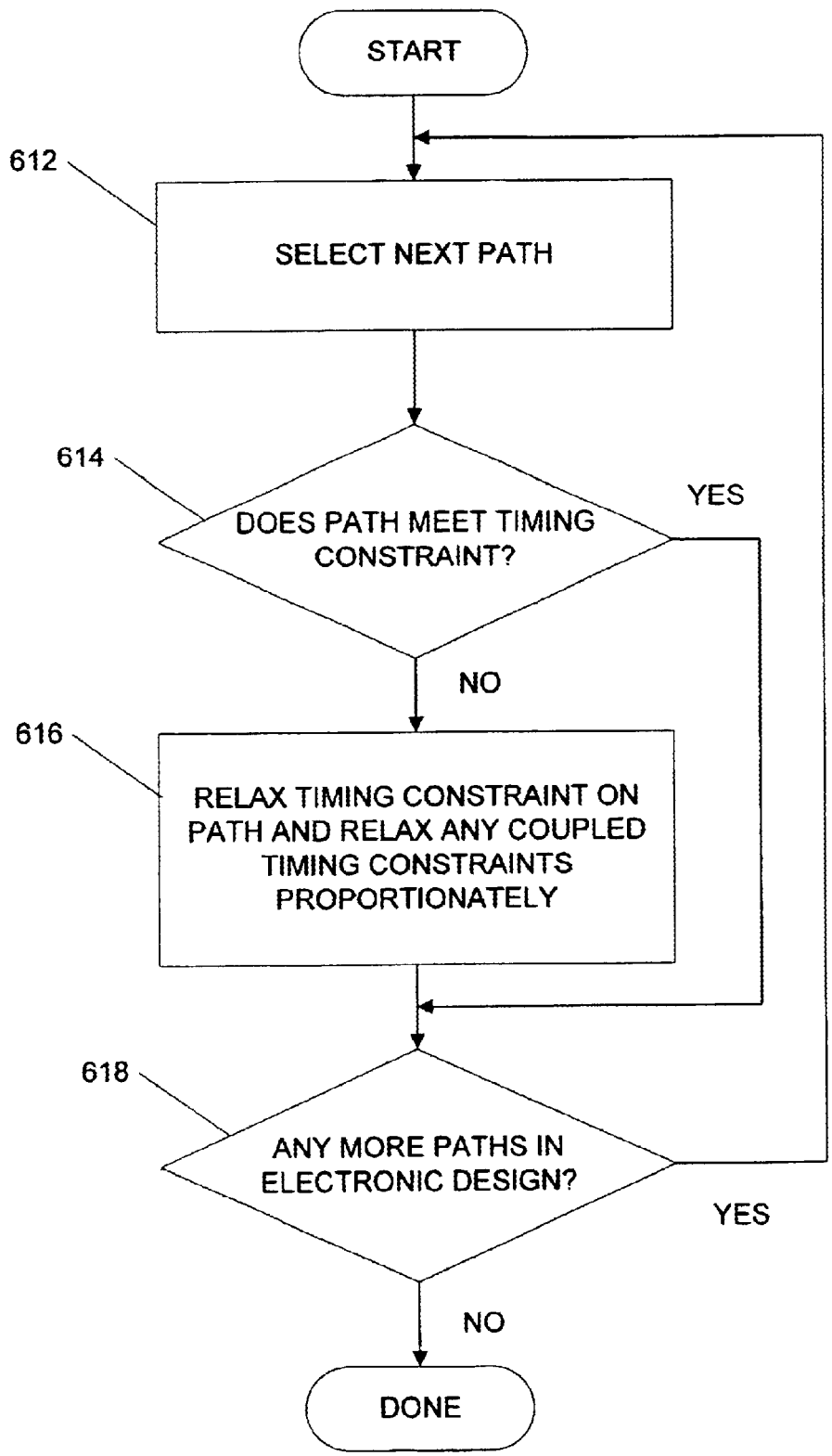
FIG. 6A is a flowchart illustrating a method for relaxing timing constraints for a path in accordance with the methods of the invention.

FIG. 6A is the flowchart identifying in further detail the relaxing of timing constraints as performed in block 510. As shown, each path is selected (612) and evaluated to determine if the estimated delays on the path meet the timing constraint (614). Where a negative slack exists (the timing constraint of the path is not met), the timing constraint for that path and any coupled timing constraints are proportionately relaxed (616). For example, where the timing constraints are defined by a common clock, the timing constraint for all paths using that same clock would be increased as a result of the longer clock cycle. Where multiple clocks are used, and a second or other clock is a multiple of a first clock, then that multiplication factor establishing the relationship between clocks is maintained to cause the second or other clock to be increased in proportion to the change effected on the first clock in relaxing the timing constraint. Where more paths in the design remain to be evaluated, the selection of a next path follows (612) and evaluation to determine if the path meets the timing constraint occurs (614). Where this next path fails to meet the constraint (614), the applicable timing constraint and coupled timing constraints are relaxed proportionately (616). The process continues until no more paths remain to be evaluated and timing constraints are relaxed as necessary to eliminate negative slacks or slack ratios in the circuit (618). For example, where the timing constraint on a selected path is 10 ns, but the current estimated delay of the longest path with that constraint is 15 ns, the timing constraint would be relaxed to 15 ns. This will result in a slack ratio of 0 being assigned to each connection on the timing path, and additional slack being added to all other (less critical) paths with that constraint. The constraint relaxation has the effect of automatically loosening timing constraints that are impossible to meet or are far from being met in the early stages of optimization. Excessive numbers of connections with high criticality, as generated by negative slacks, tend to make the optimization tools behave poorly. The automatic relaxation of timing constraints not met allows us to focus on the connections that have the greatest impact on that constraint and helps us get closer to meeting the constraint. The relaxation procedure is repeated with each timing analysis as optimization proceeds. Relaxed constraints can be retightened as optimization proceeds if progress is being made toward meeting such constraints.

Figure 7A:
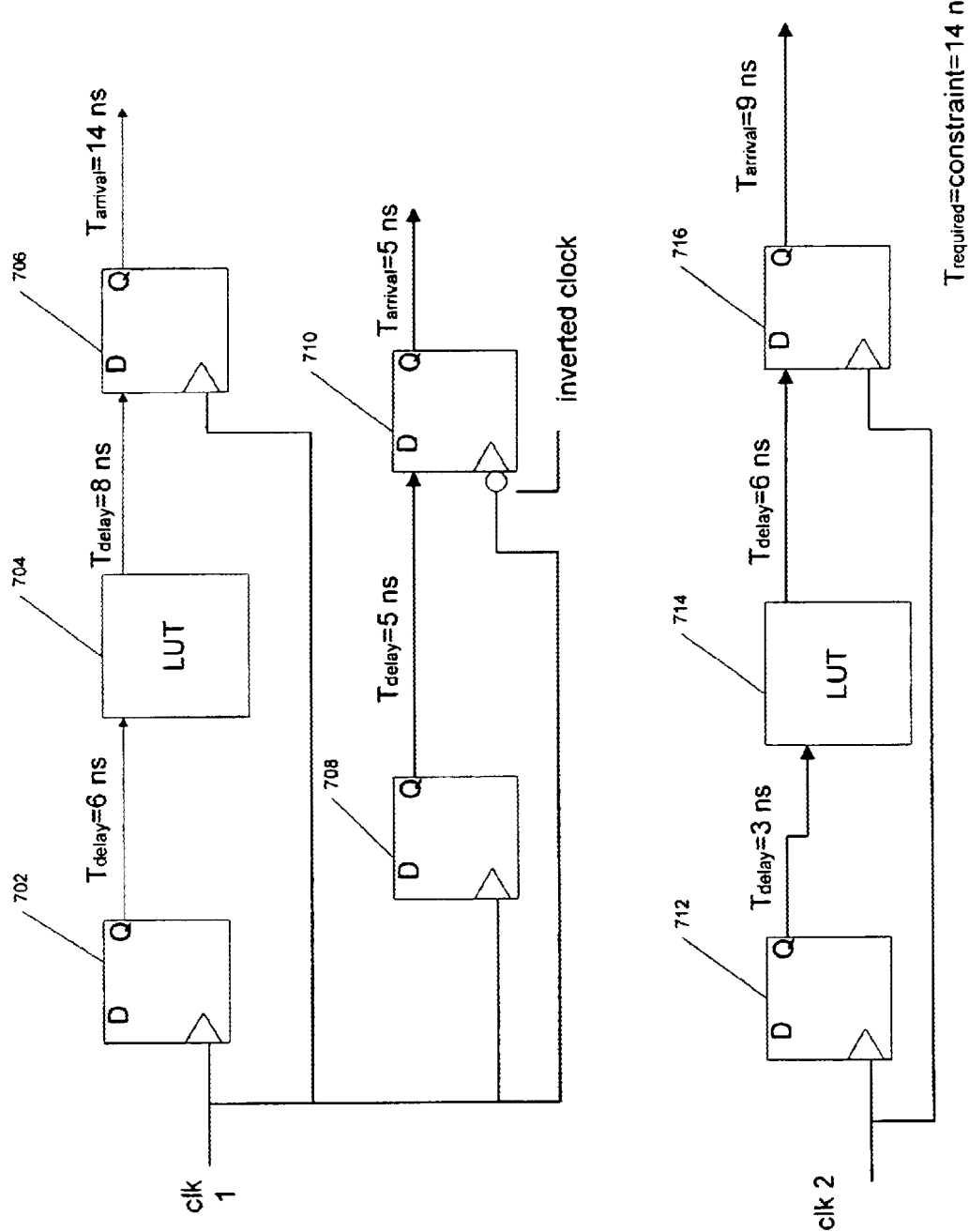
FIGS. 7A–7C are diagrams providing an example of the setting of slack ratios for connections in an electronic design in accordance with the methods of the invention.

An example showing the effects of timing constraint relaxation appears in FIG's. 7A, 7B, and 7C. In each of the drawings, reference numerals 702, 706, 708, 710, 712, 714 and 716 refer to registers whereas reference numerals 704 and 714 refer to look up tables (LUT's). A designer may specify the performance of a circuit in terms of the maximum clock frequency ("$f_{max}$") at which the circuit may operate, which is the inverse of the minimum clock period. Where no $f_{max}$ specification is provided by the user one objective might be to make the slowest clock as fast as possible. Initially the arrival times are calculated at the destination registers. In order to perform timing relaxation, the tightest constraint which could be met for the example is computed. As shown in FIG. 7A, the arrival time at the input of register 706 is 14 ns. The arrival time for the second path shown, that involving registers 708 and 710 is 5 ns. The second register is active on the negative edge of the clock, however. For clock 1, the timing constraint must be 14 ns. For the clock cycle involving registers 708 and 710, $T_{cycle}/2$ is greater than or equal to 5 ns, therefore requiring a $T_{cycle}$ of 10 ns. For clock 2, $T_{cycle}$ is greater than or equal to 9 ns. The timing constraint selected therefore would be 14 ns as the relaxed constraint for all paths.

Figure 7B:
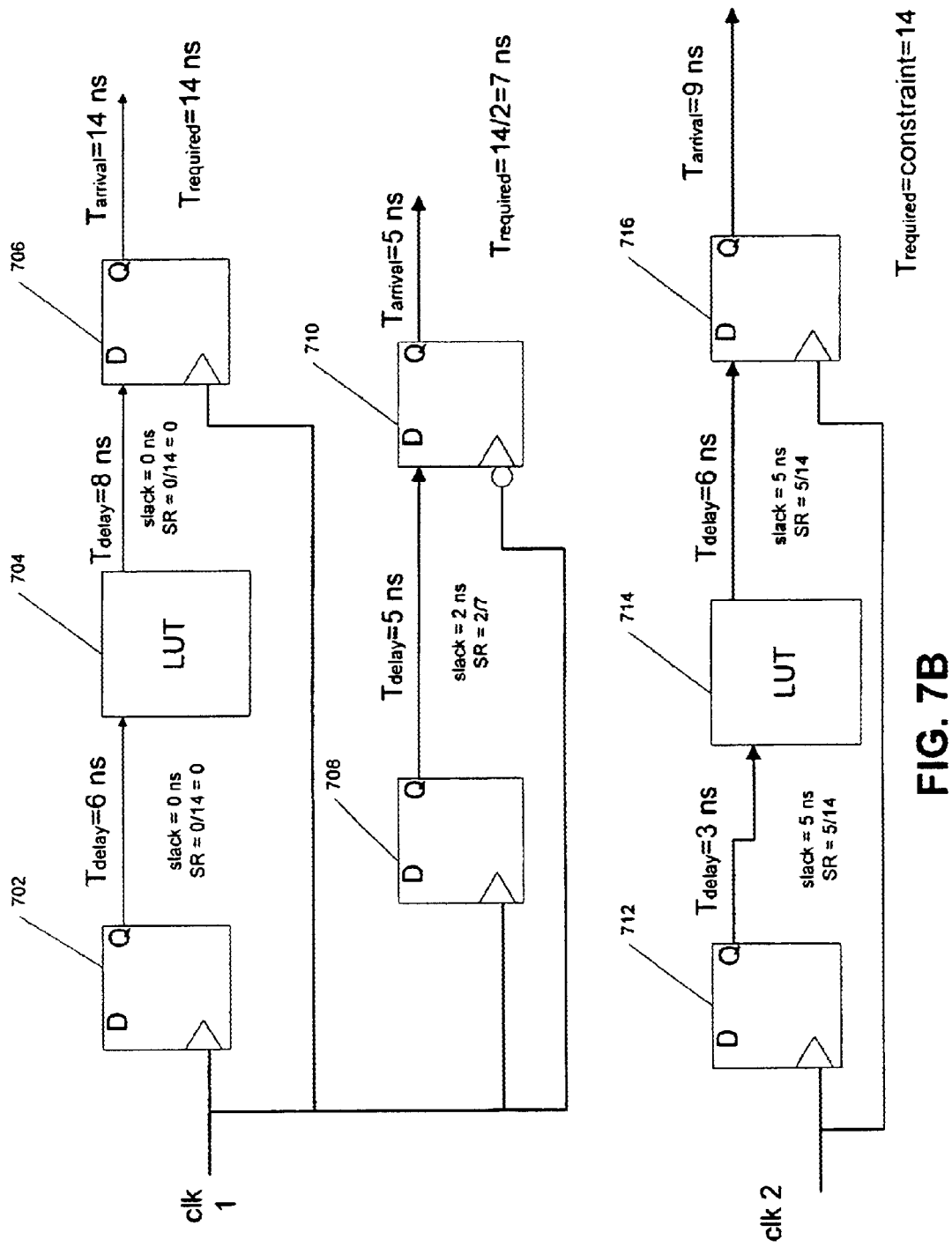

FIG. 7B is annotated with the slacks and slack ratios computed with the relaxed timing constraints. The slack ratio is computed as the slack for the path divided by the time required at the sink (relaxed value). Although not shown in this set of figures, where the connection lies on multiple paths with potentially different timing constraint (t required) values, the selected slack ratio is based on the minimum slack ratio computed for this connection of all the timing constraints on all the paths. Slack ratios are handled on multiple paths in a similar fashion to the handling of slack, i.e., the minimum value over all traversals is taken.

Figure 7C:
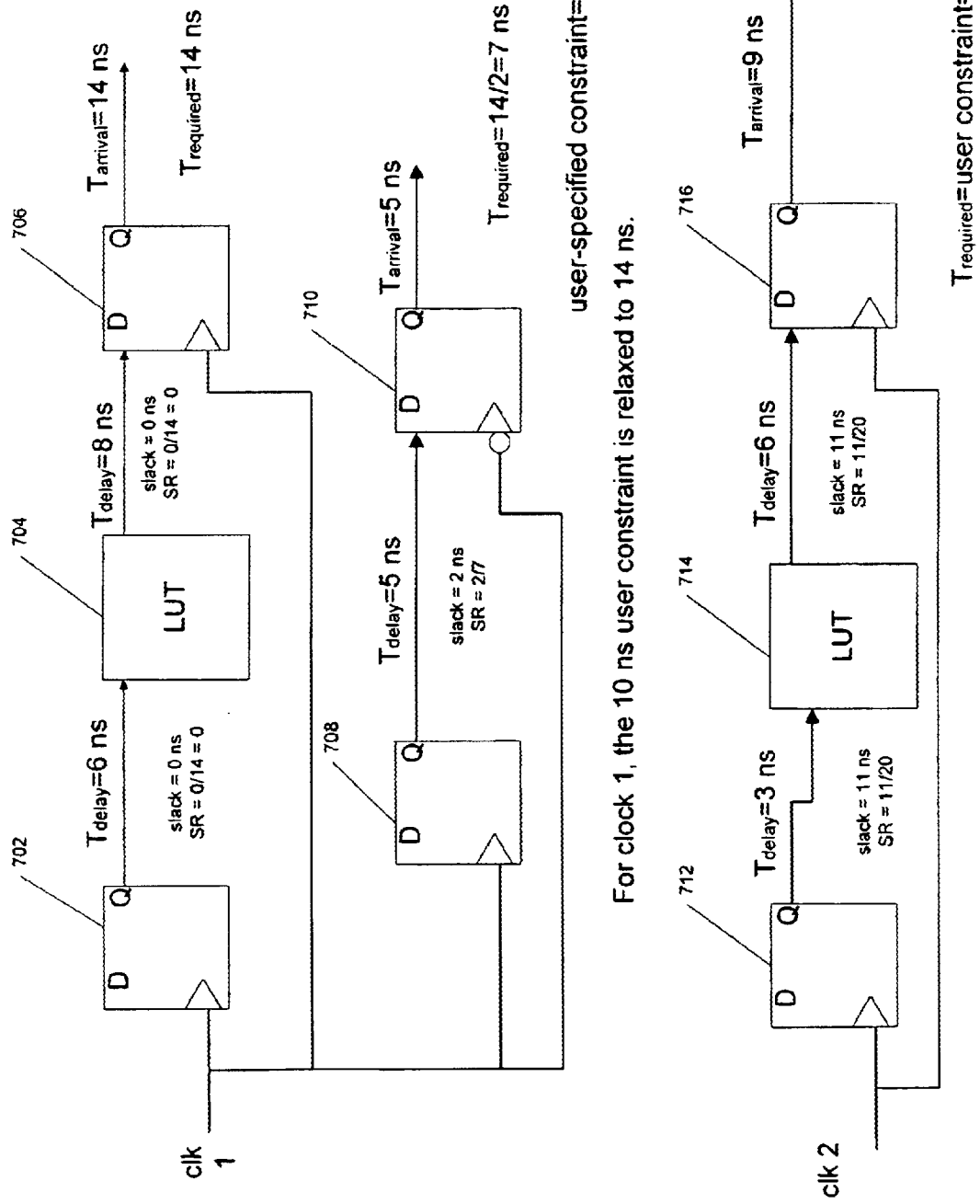

FIG. 7C shows the effect of timing constraint relaxation in the situation where the user has specified a timing constraint. Here the $f_{max}$ has been set to 100 MHz., yielding a 10 ns clock. For the path involving clock 1, the circuit does not meet the specification, so the constraint is relaxed to 14 ns. For clock 2, the user specified timing constraint is 50 MHz. or 20 ns. Since the performance of this portion of the circuit meets the timing constraint, no relaxation of the constraint would be performed. The slacks and slack ratios are computed thereafter based on the unrelaxed timing constraint of 20 ns. Since the timing constraint for this path is not coupled to the clock 1, relaxation of the timing constraint for the paths relying on clock 1 do not affect the timing constraints for this portion of the circuit.

Figure 6B:
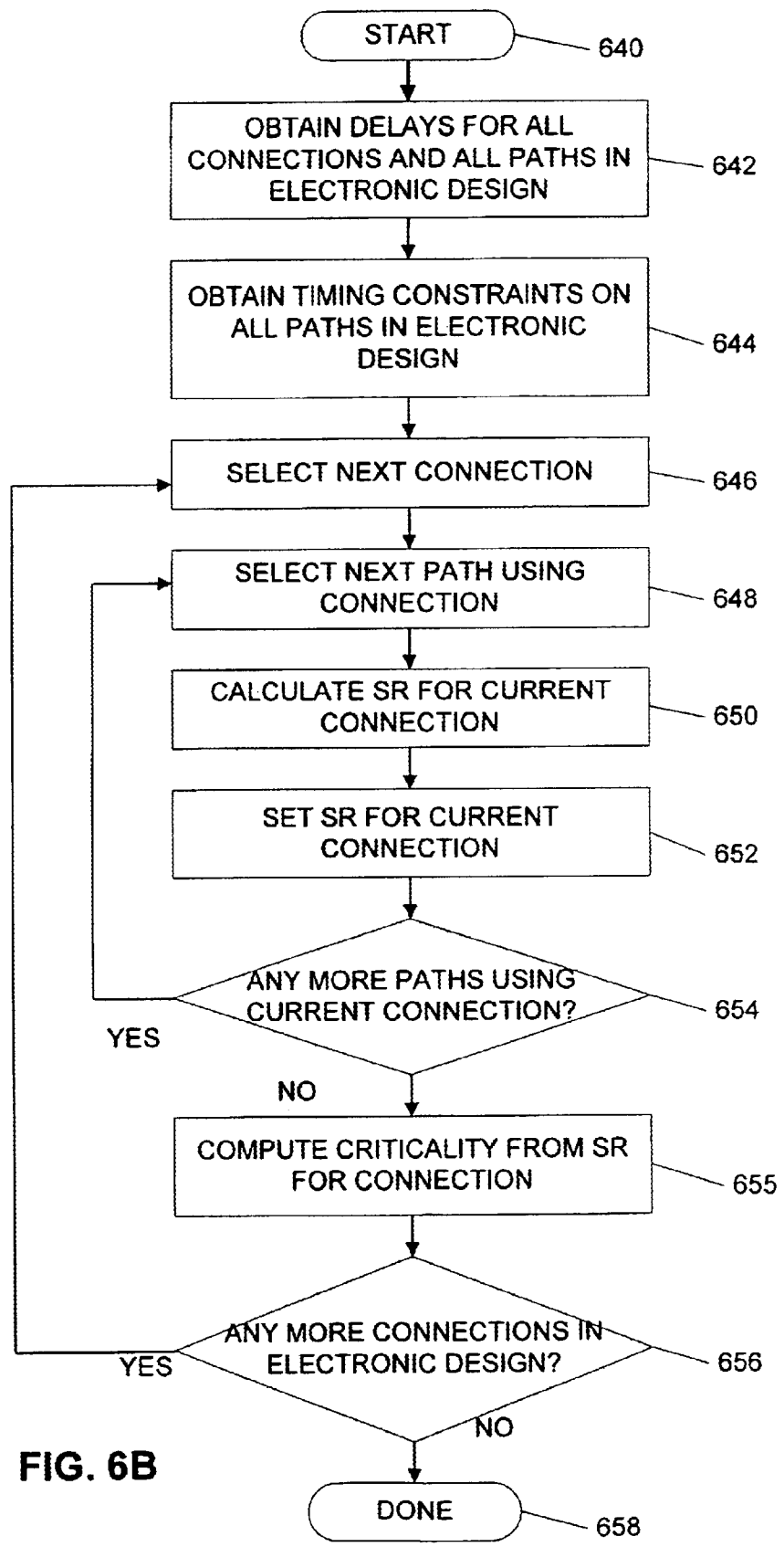
FIG. 6B is a flowchart illustrating a method for setting slack ratios for connections in an electronic design in accordance with the methods of the invention.

Returning to FIG. 5, following the relaxation of all necessary paths (510) as described above, the criticality is calculated for each estimated routing connection (512). Further details as to the sequence of events in this calculation are set forth in FIG. 6B. Each connection is selected for evaluation of its slack ratio (646) using the relaxed timing constraints. For each path using the connection, the slack ratio must be computed separately (650), first by determining the slack for that path. As indicated above, the slack ratio is the slack divided by the potentially relaxed timing constraint for the path. Where the connection appears on multiple paths, the slack ratio for the connection must be calculated separately for each path. (648–654). For each such path passing through the connection, a slack ratio for the current connection using the selected path is calculated (650). Each time, the slack ratio calculated is compared with the current slack ratio set for that connection and replaces the stored value if it represents a smaller slack ratio (652). Once the procedure completes examination of all paths for the current connection (654), criticality is computed from the minimum slack ratio determined for that particular connection (655). Various measures may be used to determine criticality from slack ratios and the present invention is not intended to be limited to the functions listed herein. For example, criticality may be an inverse function of the slack ratio, and, in one specific embodiment, is an inverse monotonic function of the slack ratio. Following the computation of criticality for the connection (655), where more connections in the electronic design remain to be evaluated (656), each connection is selected (646) and the minimum slack ratio determined for the connection as based on the paths passing through the connection (648–654). Criticality for the connection is then computed from this slack ratio (655). Evaluation of the connections and the accompanying criticality computed until no more connections remain in the electronic design (656).

Returning again to FIG. 5, after computing criticalities for all connections, selected blocks are moved followed by a recalculation of the estimated routing and delay of connections to and from the moved block (514). The example improvement algorithm involves taking a block such as an LAB and attempting to improve it by a "swap" or "move". Again an estimate is made as to the routing followed by computing an estimate for the affected connection delays.

Whether or not the move is accepted depends on the magnitudes of the new delays and the criticality of the affected connections (516). Determining whether further swap or move iterations are necessary in one embodiment turns on whether the moves have permitted the timing constraint to be met (518). Other tests can be used alone or in combination to include 1) whether the available wiring has been used up, 2) whether a certain number of swaps have been completed, or 3) whether overall timing is improving generally. Where further moves are required the moves are generally performed without another series of criticality computations in order to conserve computation time. In a specific embodiment criticality is recomputed (520) after a predetermined number of moves. However, in another embodiment, criticality is computed after every move.

In another embodiment of the present invention, the timing constraints are relaxed when routability problems occur. For example, in a PLD one limitation imposed on the designer attempting to implement an electronic design is the amount of connections or wiring available for connecting the elements of a circuit. If the wiring demand for the implemented design exceeds the amount of "wire" available in the specific device, the design implementation cannot be completed. Typically, electronic design implementation tools advise the user at that point that the design will not fit into the device. The expected routing may be monitored using the CAD tool to estimate the routing demand. Where the monitoring indicates that the routing demand will be too high for the chip to support, the timing constraint may be selectively relaxed as well as all coupled timing constraints. This situation occurs because the desire for speed optimization involves a tradeoff with the routing or wiring demands of a circuit. Often, the placement of a path across logical cells which minimize timing delays for the path will result in an increase in the routing demand for the overall circuit. As indicated, the routablity demands of the circuit are monitored and when the wiring budget for the device is expected to be exceeded, the problem timing constraints are relaxed. The problem constraints might be those not being met or those being met by a small amount, thereby leading to a small slack ratio. This feature allows optimization of the circuit in view of the competing demands of circuit speed and available wiring or routing resources. In yet another embodiment, all timing constraints are relaxed when the wiring budget is expected to be exceeded. This feature of the present invention may be directed to implementations where the primary focus is fitting a large design into a selected device or to finding the smallest device which can handle a given electronic design. Additionally, relaxing all constraints may be helpful in the early stages of a design, even where both circuit speed optimization and minimizing wiring resource consumption are objectives.

Relaxation may also be used when circuit optimization does not rely on criticality to direct placement or routing. For example, relaxation may be used when a slack allocation method is used to determine a set of upper limits on connection delays. A designer may determine these limits by examing the slacks for a set of connections and may use these limits as his guideline in placing or routing a source design so that each connection is placed or routed with a resulting delay less than this upper limit. One skilled in the art would recognize that the relaxation methods described herein could be applied when other methods are utilized to guide the generation of an electronic design in a target electronic device.

Embodiments of the present invention relate to an apparatus for performing the above-described operations. This apparatus may be specially constructed for the required purposes, or it may be a general-purpose computer selectively activated or reconfigured by a computer program stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method. The required structure for a variety of these machines will appear from the description given above.

In addition, embodiments of the present invention further relate to computer readable media that include program instructions for performing various computer-implemented operations. The media may also include, alone or in combination with the program instructions, data files, data structures, and the like. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Figure 8:
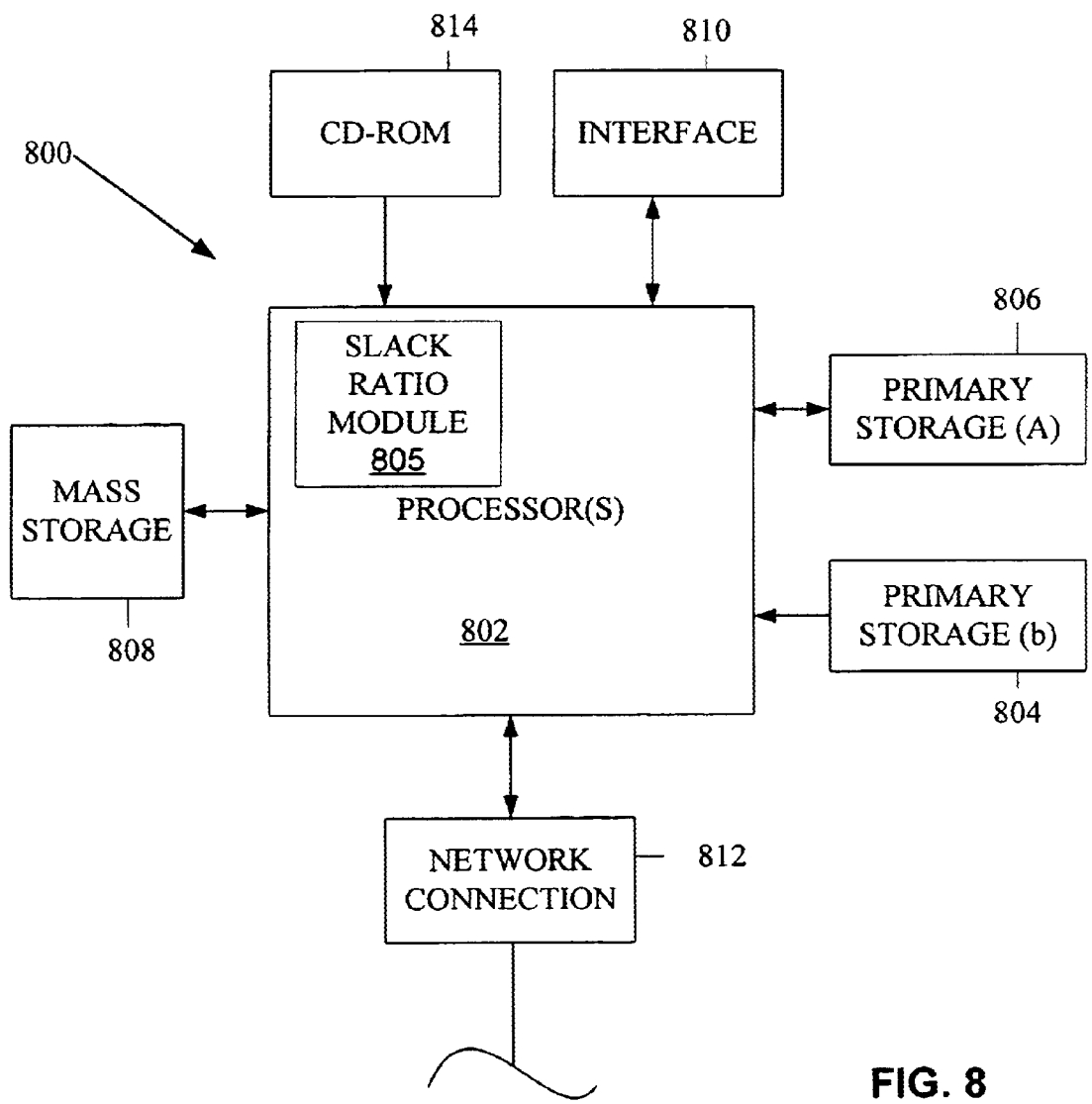
FIG. 8 is a block diagram of a general-purpose computer system that may be employed to implement the present invention.

FIG. 8 illustrates a typical computer system in accordance with an embodiment of the present invention. The computer system 800 includes any number of processors 802 (also referred to as central processing units, or CPUs) that are coupled to storage devices including primary storage 806 (typically a random access memory, or "RAM"), primary storage 804 (typically a read only memory, or "ROM"). As is well known in the art, primary storage 804 acts to transfer data and instructions uni-directionally to the CPU and primary storage 806 is used typically to transfer data and instructions in a bi-directional manner. The instructions transferred may, for example, include software module 805, which contains instructions to assign criticality to connections based on slack ratios as defined by the present invention. Both of these primary storage devices may include any suitable type of the computer-readable media described above. A mass storage device 808 is also coupled bi-directionally to CPU 802 and provides additional data storage capacity and may include any of the computer-readable media described above. The mass storage device 808 may be used to store programs, data and the like and is typically a secondary storage medium such as a hard disk that is slower than primary storage. It will be appreciated that the information retained within the mass storage device 808, may, in appropriate cases, be incorporated in standard fashion as part of primary storage 806 as virtual memory. A specific mass storage device such as a CD-ROM 814 may also pass data uni-directionally to the CPU.

CPU 802 is also coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method. The above-described devices and materials will be familiar to those of skill in the computer hardware and software arts.

The hardware elements described above may be configured (usually temporarily) to act as multiple software modules for performing the operations of this invention. For example, instructions for running an optimizing method and/or compiler may be stored on mass storage device 808 or 814 and executed on CPU 808 in conjunction with primary memory 806.

Figure 9:
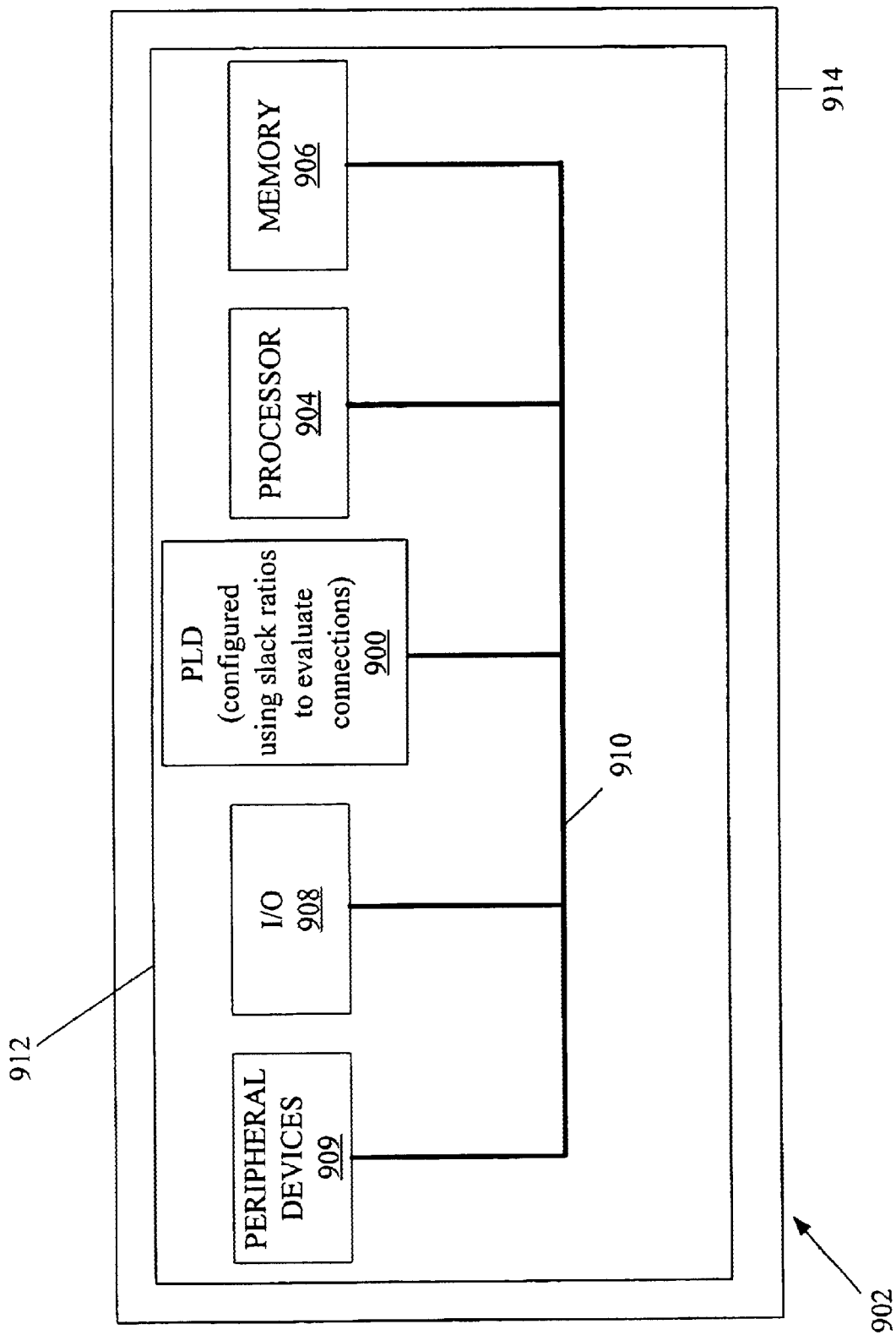
FIG. 9 is a block diagram of a programmable logic device and associated system, in which the PLD may be generated in accordance with the methods of this invention.

In one specified embodiment this invention also relates to programmable logic devices programmed with a design prepared in accordance with the above-described methods. The invention further relates to systems employing such programmable logic devices. FIG. 9 illustrates a PLD 900 of the present invention in a data processing system 902. The PLD 900 is configured by the methods described in the present invention, for example by the methods described for evaluating criticality using slack ratios. The data processing system 902 may include one or more of the following components: a processor 904, memory 906, I/O circuitry 908, and peripheral devices 909. These components are coupled together by a system bus 910 and are populated on a circuit board 912 that is contained in an end-user system 914.

The system 902 can be used in a wide variety of applications, such as computer networking, data networking, instrumentation, video processing, digital signal processing, or any other application where the advantage of using programmable logic (including reprogramable logic) is desirable. The PLD 900 can be used to perform a variety of different logic functions. For example, PLD 900 can be configured as a processor or controller that works in cooperation with processor 904. The PLD 900 may also be used as an arbiter for arbitrating access to a shared resource in the system 902. In yet another example, the PLD 900 can be configured as an interface between the processor 904 and one of the other components in the system 902. It should be noted that the system 902 is only exemplary.

The foregoing describes the present invention and its presently specified embodiments. Numerous modifications and variations in the practice of this invention are expected to occur to those skilled in the art. For instance, the techniques and systems of the present invention are suitable for use with a wide variety of EDA tools and methodologies for programming or implementing a device. Therefore, the described embodiments should be taken as illustrative and not restrictive, and the invention should not be limited to the details given herein but should be defined by the following claims and their full scope of equivalents.

What is claimed is:

1. A method of generating an electronic design comprising:

receiving an electronic representation of the electronic design, said electronic representation including various connections between various blocks specifying functions performed within the electronic design, each connection forming part of one or more paths through at least a portion of the electronic design, at least one path having an associated timing constraint which is an allowed time delay for a signal to propagate between a start and end point on the path;

assigning criticality values to at least one of the connections, each of said criticality values based upon a slack ratio between the timing constraint and a value of slack determined between the start and end points for the path on which the connection resides; and revising the electronic representation in response to the criticality values.

2. The method of claim 1 wherein revising the electronic representation in response to the criticality values comprises revising the electronic representation in a manner that biases the electronic representation toward a state in which individual connections having relatively high criticality are not changed in a manner that increases a delay or are changed in a manner that reduces delay.

3. The method of claim 1 wherein the electronic representation is received in the form of code written in a hardware description language.

4. The method of claim 1 wherein the electronic representation is received in the form of a schematic electronically captured.

5. The method of claim 1 wherein the electronic representation is received in the form of at least one of a netlist, electronically captured schematic, coded hardware description language, and other coded high level computer language.

6. The method of claim 1 wherein the blocks comprise one of the group of logic blocks, logic cells, RAM, LAB's, and I/O pads.

7. The method of claim 1 wherein the criticality is an inverse monotonic function of slack ratio.

8. The method of claim 1 wherein the slack ratio is defined as the value of slack divided by the timing constraint for a path on which a connection under consideration resides.

9. The method of claim 1 wherein the slack ratio for a connection under consideration is the lowest value of slack ratio for each of the paths on which the connection under consideration resides.

10. The method of claim 1 wherein the connections include at least one of conductive lines and switches.

11. The method of claim 1 wherein the electronic design is a CPLD, FPGA, ASIC, programmable logic device, general purpose microprocessor, or board level circuit implementation.

12. The method of claim 1 further comprising relaxing the timing constraints for a path and any coupled timing constraints proportionately when a negative slack is determined for a path.

13. The method of claim 1 further comprising relaxing the timing constraints for a path and any coupled timing constraints proportionately when a negative slack is determined for a connection.

14. The method of claim 1 further comprising:
calculating new criticality values for at least one of the connections based on the revised electronic representation; and
repeating revising the electronic representation in response to the criticality values with the new criticality values.

15. The method of claim 1 further comprising iteratively repeating revising the electronic representation in response to the criticality values.

16. The method of claim 15, further comprising:
prior to an iteration of revising the electronic representation in response to the criticality values, determining whether to calculate new criticality values for at least one of the connections; and
if necessary, calculating said new criticality values prior to said iteration of revising the electronic representation in response to the criticality values.

17. The method of claim 1 wherein revising the electronic representation comprises revising the placement of blocks or routing of lines in the electronic representation.

18. A programmable logic device produced by the method of claim 1.

19. A method of generating an electronic design comprising:
receiving an electronic representation of the electronic design, said electronic representation including various connections between various blocks specifying functions performed within the electronic design, each connection forming part of one or more paths through a least a portion of the electronic design, at least one path having an associated timing constraint which is an allowed time delay for a signal to propagate between a start and end point on the path;

relaxing on a temporary basis the timing constraints for a path and any coupled timing constraints proportionately when the propagation time for at least one path exceeds the associated timing constraint for the at least one path;

identifying critical paths for revision based on the temporarily relaxed timing constraints; and revising the electronic representation in response to the relaxed timing constraints and the critical paths identified for revision.

20. The method of claim 19 wherein revising the electronic representation in response to the relaxed timing constraints comprises:
assigning criticality values to at least one of the connections, each of said criticality values based upon a slack ratio that is a function of the timing constraints and values of slack for paths on which the connections reside; and
revising the electronic representation in response to the criticality values.

21. The method of claim 20 wherein revising the electronic representation in response to the criticality values comprises revising the electronic representation in a manner that biases the electronic representation toward a state in which individual connections having relatively high criticality are not changed in a manner that increases a delay or are changed in a manner that reduces delay.

22. The method of claim 20 wherein the electronic representation is received in the form of code written in a hardware description language.

23. The method of claim 20 wherein the electronic representation is received in the form of a schematic electronically captured.

24. The method of claim 20 wherein the electronic representation is received in the form of a netlist, electronically captured schematic, coded hardware description language, or other coded high level computer language.

25. The method of claim 20 wherein the blocks comprise one of the group of logic blocks, logic cells, RAM, LAB's, and I/O pads.

26. The method of claim 19 wherein revising the electronic representation in response to the relaxed timing constraints comprises:
determining an upper limit for a delay of each connection; and revising the electronic representation in a manner that each connection does not exceed its upper limit.

27. The method of claim 19 wherein the relaxing the timing constraints for a path and any coupled timing constraints proportionately occurs when a negative slack is determined for a connection, and wherein the criticality values are functions of the values of slack for paths on which the connections reside.

28. The method of claim 19 wherein the relaxing the timing constraints for a path and any coupled timing constraints proportionately occurs when a negative slack ratio is determined for a connection and wherein the criticality values are based upon a slack ratio that is a function of the timing constraints and values of slack for paths on which the connections reside.

29. The method of claim 28 wherein the criticality is an inverse monotonic function of slack ratio.

30. The method of claim 28 wherein the slack ratio is defined as the value of slack divided by the timing constraint for a path on which a connection under consideration resides.

31. The method of claim 28 wherein the slack ratio for a connection under consideration is the lowest value of slack ratio for each of the paths on which the connection under consideration resides.

32. The method of claim 19 wherein the relaxing the timing constraints for a path and any coupled timing constraints proportionately occurs when routability problems occur.

33. The method of claim 32 wherein the path is one of a plurality of paths and wherein the method further comprises relaxing the timing constraints for each of the remaining paths in the plurality.

34. The method of claim 19 wherein the connections include at least one of conductive lines and switches.

35. The method of claim 19 wherein the electronic design is a CPLD, FPGA, ASIC, programmable logic device, general purpose microprocessor, or board level circuit implementation.

36. A programmable logic device produced by the method of claim 19.

37. A computer program product comprising:
a machine readable medium having stored thereon program instructions for a method of generating an electronic design, the method comprising:
receiving an electronic representation of the electronic design, said electronic representation including various connections between various blocks specifying functions performed within the electronic design, each connection forming part of one or more paths through at least a portion of the electronic design, at least one path having an associated timing constraint which is an allowed time delay for a signal to propagate between a start and end point on the path;
assigning criticality values to at least one of the connections, each of said criticality values based upon a slack ratio between the timing constraint and a value of slack determined between the start and end points for the path on which the connections resides; and
revising the electronic representation in response to the criticality values.

38. The computer program product of claim 37, wherein the machine readable medium further comprises program instructions for revising the electronic representation in response to the criticality values comprises revising the electronic representation in a manner that biases the electronic representation toward a state in which individual connections having relatively high criticality are not changed in a manner that increases a delay or are changed in a manner that reduces delay.

39. The computer program product of claim 37, wherein the machine readable medium further comprises program instructions for relaxing the timing constraints for a path and any coupled timing constraints proportionately when a negative slack is determined for a connection.

40. The computer program product of claim 37, wherein the machine readable medium further comprises program instructions for relaxing the timing constraints for a path and any coupled timing constraints proportionately when a negative slack ratio is determined for a path.

41. A computer program product comprising:
a machine readable medium having stored thereon program instructions for a method of generating an electronic design, the method comprising:
receiving an electronic representation of the electronic design, said electronic representation including various connections between various blocks specifying functions performed within the electronic design, each connection forming part of one or more paths through a least a portion of the electronic design, at least one path having an associated timing constraint which is an allowed time delay for a signal to propagate between a start and end point on the path;
relaxing on a temporary basis the timing constraints for a path and any coupled timing constraints proportionately when the propagation time for at least one path exceeds the associated timing constraint for the at least one path;
identifying critical paths for revision based on the temporarily relaxed timing constraints; and
revising the electronic representation in response to the relaxed timing constraints and the critical paths identified for revision.

42. The computer program product of claim 41, wherein revising the electronic representation in response to the relaxed timing constraints comprises:
assigning criticality values to at least one of the connections, each of said criticality values based upon a slack ratio that is a function of the timing constraints and values of slack for paths on which the connections reside; and
revising the electronic representation in response to the criticality values.

43. The computer program product of claim 41, wherein revising the electronic representation in response to the relaxed timing constraints comprises:
determining the upper limit for the delay of each connection; and
revising the electronic representation in a manner that each connection does not exceed its upper limit.

44. The computer program product of claim 41, wherein the revising the electronic representation in response to the criticality values comprises revising the electronic representation in a manner that biases the electronic representation toward a state in which individual connections having relatively high criticality are not changed in a manner that increases a delay or are changed in a manner that reduces delay.

45. The computer program product of claim 41, wherein the relaxing the timing constraints for a path and any coupled timing constraints proportionately occurs when a negative slack is determined for a connection, and wherein the criticality values are functions of the values of slack for paths on which the connections reside.

46. A computer system comprising:
   at least one cpu;
   memory; and
   an interface for communicating with an individual;
      wherein the computer system is configured to receive an electronic representation of the electronic design, said electronic representation including various connections between various blocks specifying functions performed within the electronic design, each connection forming part of one or more paths through a least a portion of the electronic design, at least one path having an associated timing constraint which is an allowed time delay for a signal to propagate between a start and end point on the path;
      wherein the computer system is further configured to assign criticality values to at least one of the connections, each of said criticality values based upon a slack ratio between the timing constraint and a value of slack determined between the start and end points for the path on which the connections resides; and
      wherein the computer system is further configured to revise the electronic representation in response to the criticality values.

47. The computer system of claim 46, wherein revising the electronic representation in response to the criticality values comprises revising the electronic representation in a manner that biases the electronic representation toward a state in which individual connections having relatively high criticality are not changed in a manner that increases a delay or are changed in a manner that reduces delay.

48. The computer system of claim 46, wherein the system is further configured to relax the timing constraints for a path and any coupled timing constraints proportionately when a negative slack ratio is determined for a connection.

49. A computer system comprising:
   at least one cpu;
   memory; and
   an interface for communicating with an individual;
      wherein the computer system is configured to receive an electronic representation of the electronic design, said electronic representation including various connections between various blocks specifying functions performed within the electronic design, each connection forming part of one or more paths through a least a portion of the electronic design, at least one path having an associated timing constraint which is an allowed time delay for a signal to propagate between a start and end point on the path;
      wherein the computer system is further configured to assign criticality values to at least one of the connections,
      wherein the computer system is further configured to relax on a temporary basis the timing constraints for a path and any coupled timing constraints proportionately when the propagation time for at least one path exceeds the associated timing constraint for the at least one path;
      identifying critical paths for revision based on the temporarily relaxed timing constraints; and
      wherein the computer system is further configured to revise the electronic representation in response to the relaxed timing constraints and the critical paths identified for revision.

50. The computer system of claim 49, wherein the relaxing the timing constraints for a path and any coupled timing constraints proportionately occurs when routability problems occur.

51. The computer system of claim 49, wherein revising the electronic representation in response to the relaxed timing constraints comprises:
   assigning criticality values to at least one of the connections, each of said criticality values based upon a slack ratio that is a function of the timing constraints and values of slack for paths on which the connections reside; and
   revising the electronic representation in response to the criticality values.

52. The computer system of claim 49, wherein revising the electronic representation in response to the relaxed timing constraints comprises:
   determining the upper limit for the delay of each connection; and
   revising the electronic representation in a manner that each connection does not exceed its upper limit.

* * * * *